United States Patent [19]
Tomek et al.

[11] Patent Number: 5,159,978
[45] Date of Patent: Nov. 3, 1992

[54] CONNECTING APPARATUS FOR LOGGING TOOLS INCLUDING ELECTRICAL FEEDTHROUGH AND ISOLATION SYSTEM WITH BRIDLE ASSEMBLY

[75] Inventors: Martin L. Tomek, Houston; Kirk K. Stradley, Ft. Worth, both of Tex.

[73] Assignee: Halliburton Logging Services, Inc., Houston, Tex.

[21] Appl. No.: 744,139

[22] Filed: Aug. 13, 1991

[51] Int. Cl.$^5$ .............................. E21B 49/00
[52] U.S. Cl. .................... 166/250; 166/65.1; 166/66; 324/355
[58] Field of Search ............ 166/65.1, 66, 250; 73/152; 324/355, 373

[56] References Cited

U.S. PATENT DOCUMENTS

| | | | |
|---|---|---|---|
| 3,124,742 | 3/1964 | Schneider | 324/373 |
| 3,388,325 | 6/1968 | Birdwell et al. | 324/373 |
| 3,831,443 | 8/1974 | Plance | 73/152 |
| 4,286,217 | 8/1981 | Planche et al. | 324/373 X |
| 4,335,353 | 6/1982 | Lacour-Gayer | 324/375 X |
| 4,697,638 | 10/1987 | Knight | 166/65.1 |
| 5,038,108 | 8/1991 | Lessi et al. | 324/355 |

FOREIGN PATENT DOCUMENTS 2141549 12/1984 United Kingdom ............... 324/355

Primary Examiner—Hoang C. Dang
Attorney, Agent, or Firm—William J. Beard

[57] ABSTRACT

A rigid bridle for supporting a current emitting logging tool in a sonde is set forth. The rigid bridle is formed of multiple segments of tubular members, normally formed of metal. At selected locations along the length thereof, they are interrupted by electrical insulators which prevent current flow along the length thereof. Moreover, the external surface is coated with first one and then the second layer of insulative material; three such units in serial assembly support a return current electrode for use in a current emitting logging tool. In an alternate form, a short electrical isolator joint is set forth which includes concentric metal members which are spaced from one another when assembled by insulative members positioned therebetween so that current flow along the length thereof is prevented.

10 Claims, 2 Drawing Sheets

FIG.1
FIG.3
FIG.4
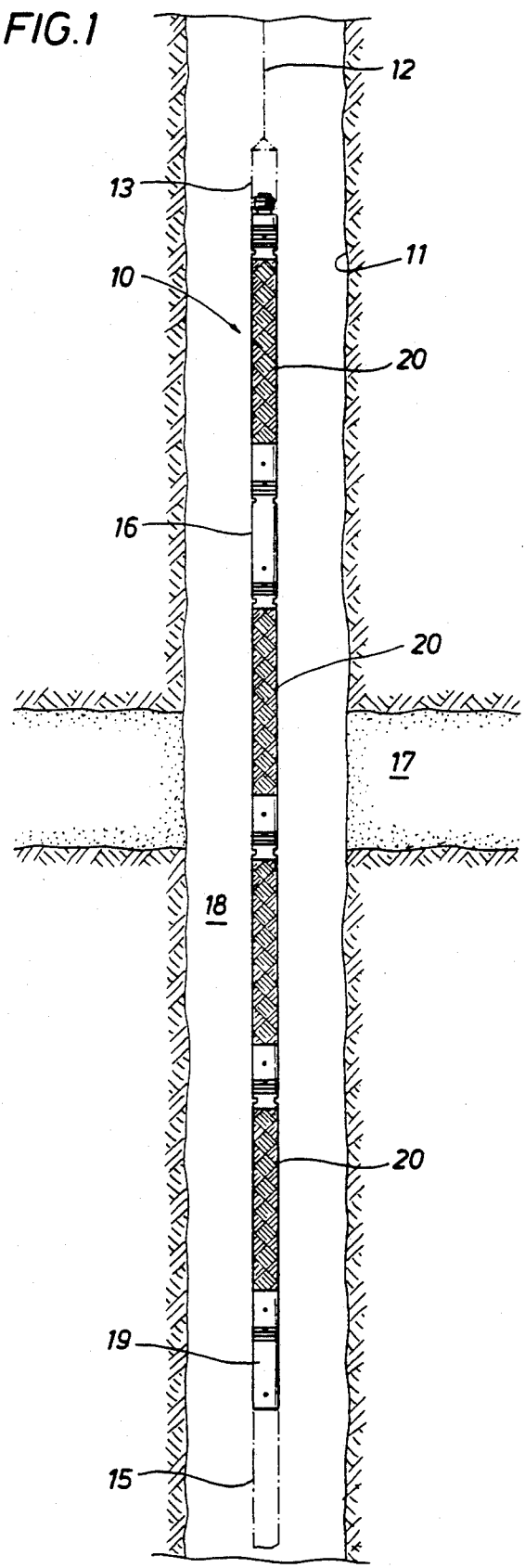
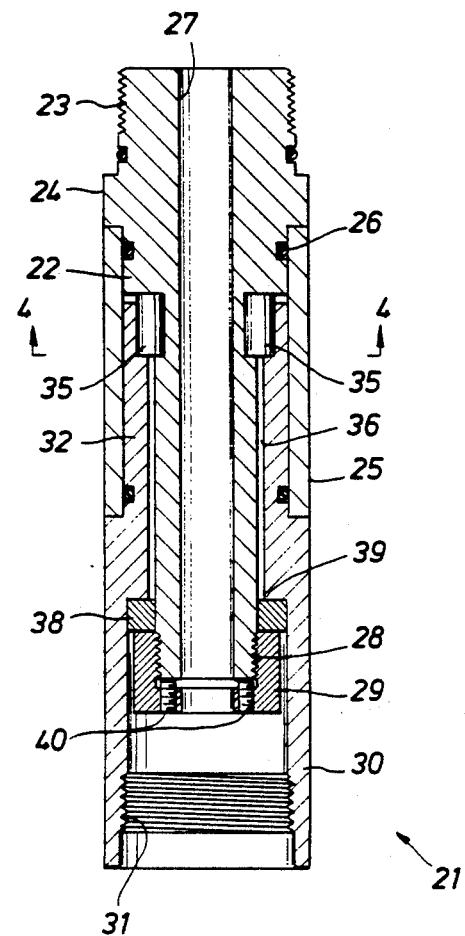
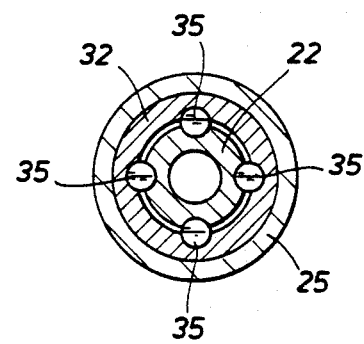

CONNECTING APPARATUS FOR LOGGING TOOLS INCLUDING ELECTRICAL FEEDTHROUGH AND ISOLATION SYSTEM WITH BRIDLE ASSEMBLY

BACKGROUND OF THE DISCLOSURE

The present disclosure is directed to a connecting apparatus which secures a logging cable at its lower end through a cable head to a logging tool, and more particularly to one which provides for electrical feedthrough for the connecting conductors. It also serves as a bridle assembly which is electrically isolated. The context in which the present apparatus is used will be described below.

One logging technique involves suspending a logging tool constructed in a hermetically sealed sonde in a well borehole. In one approach, current is formed by the logging tool and flows out of the logging tool seeking a return point. The current will flow back to the logging tool at various places along the logging tool, cable head or the cable depending on the relative electrical isolation of the various components in the tool and the connective equipment. It is desirable to control the current return path so that it returns at a specified location. Otherwise, it might return at a point which is too close to the point of emission, or it may be forced to flow through excessive distances. Moreover, this current return path is partially dependent on the circumstances in which the tool is used, namely, the current return path may be shunted by well borehole fluids which are highly conductive in comparison with other pathways. With these circumstances in view, it is desirable to control that current return path. It has been determined that a return electrode can be spaced above the sonde by a specified distance which is approximately forty-six feet above the sonde so that the return electrode (a circular sleeve) is spaced a precise distance from the current emitting electrode in the sonde. Problems arise with this because it then defines an elongate tool assembly which is quite long. Sometimes, the sonde and the associated equipment assembled with it are so long that they are difficult to assemble at a drilling rig floor. Where there is an overhead draw works more than ninety feet above the rig floor, this does not pose much of a problem. However, it can be a problem where the drilling rig has been dismantled and moved away from the well. For instance, a small tilt up workover rig may be all that is available at a later time and they typically are constructed to extend only about thirty-three or thirty-four feet above the rig floor. In other words, there is not sufficient overhead room for extremely long tools to be positioned above the rig floor suspended from the overhead draw works.

The present apparatus sets out a rigid bridle assembly which positions the return electrode at the desired point. Moreover, the present disclosure sets out a bridle assembly which can be assembled from short segments so that any height of overhead draw works can be used, even the shortest derrick available. The bridle assembly of this disclosure further alternately includes an electrical isolation sub which is installed at one or more locations in the completed assembly wherein the sub has an open passageway through the middle for electrical connections to be positioned therein. This entails connection of one or more conductors from the cable head to the logging tool proper. It is not uncommon to construct logging cables with multiple conductors, typically even as many as seven. The logging cable thus normally terminates at a cable head, and the present apparatus defines a short connective sub which permits those conductors to be extended therethrough. Indeed, while the cable head may bring in only seven conductors, there may be other conductors, for instance those which connect with the return electrode, and to this end, the present system is connected so that it supports a specified large number of internal conductors. In the preferred embodiment, as will be disclosed, this provides plug and socket assemblies which have nineteen pins in one embodiment.

The present apparatus further includes sufficient structure to be rigid and thus obtain the benefit of metal construction, but the surface is nevertheless isolated so that it does not serve as a current return electrode. To the extent that there are metal components exposed on the exterior, they are isolated. Moreover, the bulk of the exterior is wrapped in or covered with an insulative material.

With the foregoing background in view, the present apparatus is described as an elongate repetitively installed pin and box connected subassembly which threads together to form a completed assembly. An alternate device is a relatively short isolation sub. In the preferred embodiment, the short isolation sub is constructed of upper and lower sleeves having appropriate threads for assembly in a tool, and the sleeves are coupled together in a non-rotating fashion. In the completed assembly, there is an axial passage therethrough for electrical conductors. In addition to the short isolation sub, there is the isolator joint which is substantially longer. It has the benefit of a steel internal sub for strength and reinforcing, but nevertheless it also includes an external wrap. This is included for assembly purposes yet also provides electrical insulation around the structure. The isolator joint has appropriate threaded connections at both ends and appropriately positioned multiple pin plugs and sockets so that electrical current is conducted through the center of this axially hollow structure by means of multiple conductors. Ideally, three of the isolator joints are assembled to position a return electrode at a desired spacing from a current emitting electrode on a sonde supported by the present apparatus which is installed between the sonde and the lower end of a logging cable. An isolator joint is also placed above the return electrode to isolate it from the cable head.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 shows the rigid bridle with isolator joints assembled on a logging cable to support a sonde therebelow and which further positions a return current electrode at desired spacing from the sonde;

FIG. 3 is a sectional view along the length of an isolator sub showing details of construction; and FIG. 4 is a sectional view along the line 3—3 of FIG. 3 showing how the sub is assembled and further showing pins which prevent rotation.

Figure 2:
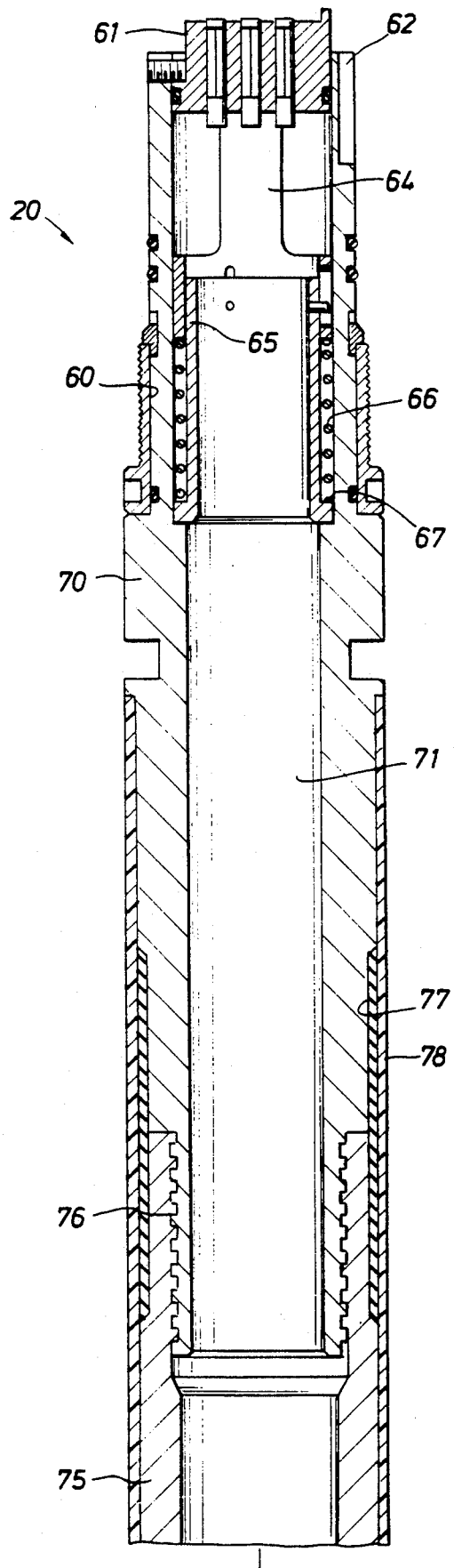
FIG. 2 is a sectional view through an isolator joint showing details of construction.
Figure 2:
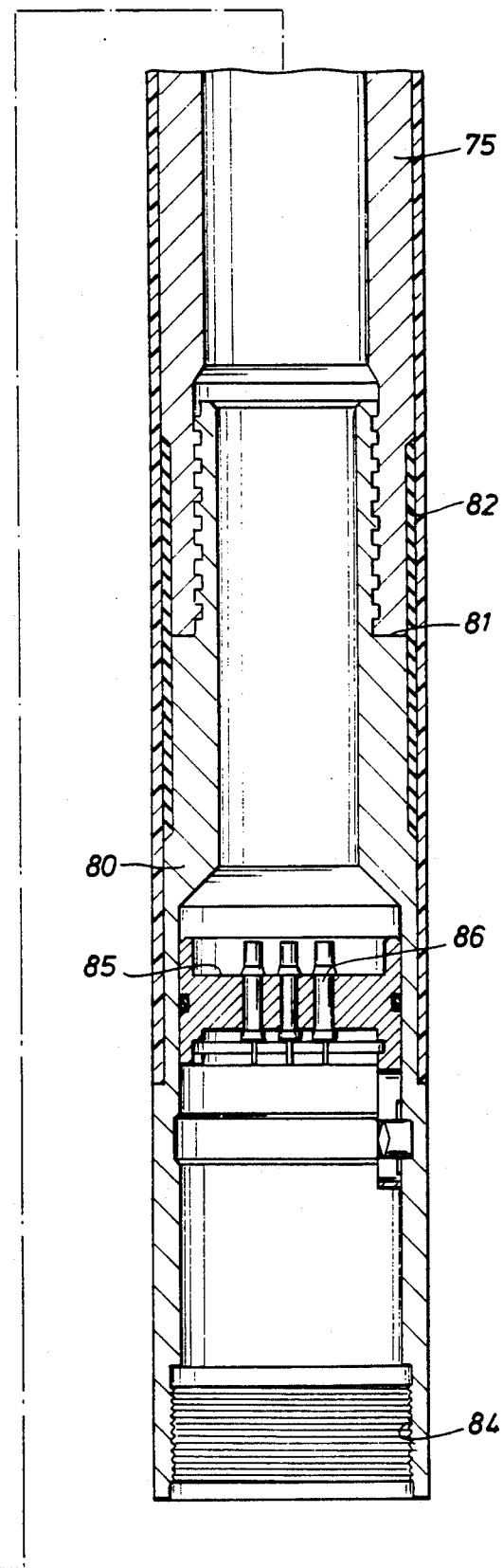

DETAILED DESCRIPTION OF THE PREFERRED EMBODIMENT OF A RIGID BRIDLE AND ASSOCIATED ISOLATOR JOINT

Going now to FIG. 1 of the drawings, the numeral 10 identifies the present apparatus which is suspended in a well borehole 11 by means of a logging cable 12 connected with a cable head 13 and threaded to the present apparatus 10. The numeral 15 identifies a logging tool affixed to the lower end of the present apparatus which has a current emitting electrode which causes current to flow out into the adjacent formations. The current flows to a return electrode 16 which is spaced at a particular distance and location from the remainder of the equipment, and the return path includes the adjacent formations 17 penetrated by the well borehole 11. Moreover, all of this is accomplished with a column of drilling fluid 18 in the well borehole 11 so that the fluid makes up part of the return pathway for current flow. The present apparatus is assembled of several units of the isolator joint identified by the numeral 20 which define a rigid bridle.

In the usual course of events, the apparatus shown in FIG. 1 is lowered to the bottom of the well and then is retrieved on the logging cable 12. The logging cable normally incorporates one or more conductors which are electrically isolated from one another and which extend the full length of the cable to the surface. Moreover, the logging cable 12 is normally provided with a strength member similar to a woven wire rope or the like. The cable is normally also protected by an outer sheath that surrounds the cable. It connects with a cable head 13 which is an apparatus believed to be well known in the art. Below the cable head 13, there is a barrier sub 19 which is connected at the top end of the sonde 15 which includes the logging equipment. This is a set of electrical feedthroughs for the various conductors extending from the cable head 13 into the sonde 15. Further, the barrier sub 19 includes a transverse bulkhead which prevents fluid entry into the sonde 15 in the unlikely event that there is a leak in the rigid bridle 10 of the present disclosure. This barrier sub thus secures the hermetic seal which isolates the equipment within the sonde 15. Briefly, all the equipment shown in FIG. 1 is lowered on the logging cable unspooled at the well head and is lowered to the bottom of the well and then retrieved as the cable is spooled onto the storage drum. As the logging tool 15 travels along the well borehole 11, current is emitted from electrodes on the sonde 15, and that current is guided by various and sundry shield electrodes which cause the current to be focused outwardly and into the adjacent formations 17 along the well borehole. The current flows away from the tool 15 but tends to return to complete an electrical circuit through the formation. This current return requires that the current be input to some kind of exposed terminal which completes the current circuit. The present system enables the current to be returned at the carefully positioned return electrode 16 which is located at a spaced distance from the sonde 15 so that return current is at this particular location. The return current is preferably directed to this location inasmuch as return at other points along the rigid bridle will create errors in the readings. Moreover, the return electrode 16 is connected with appropriate voltmeters and ammeters which provide suitable measurements used in conversion of the measurements into formation resistivity or the inverse which is conductivity. Logging continues as the logging cable 12 is raised in the well borehole and logging operations thus provide data useful for all the formations along the borehole 11.

ISOLATOR JOINT

The isolator joint shown in FIG. 2 was previously identified with the numeral 20. More specifically, this apparatus will be described proceeding from the top end. FIG. 2 shows the isolator 20 of the present disclosure. It is normally supplied in a length which is somewhat less than half the overhead clearance between the well head and a portable or low profile tilt up workover rig. That is a distance typically of about thirty-two or thirty-three feet. Accordingly, the isolator joint has an ideal length of about fifteen feet. Two connected serially will encompass thirty feet which is a distance which can be handled by small tilt up rigs. Accordingly, this structure is limited in length. Beginning at the upper end, there is a threaded pin connection 60 at the upper end and that positions a multi-pin socket 61 for connection. Conveniently, there is a guide slot 62 which assures proper mating. This socket includes a specified number, typically up to about twenty, of pins enabling that specific number of conductors to be extended through the isolator 20. They are located on the interior.

For shock mounting connection, the socket 61 is supported on an upstanding sleeve 64 which in turn connects with an inner sleeve 65. The sleeve is able to telescope in movement. The sleeve 65 bears against a compressed coil spring 66. This spring forces the socket upwardly as shown in FIG. 2. The spring is captured on the exterior of sleeve 65, by the lower shoulder 67. Moreover, the spring is also captured in an annular space in the interior of an elongate upper body which is in the form of a hollow axial sub which identified by the numeral 70. It supports the threaded connection 60 on the exterior and the spring 66 on the interior in the annular space. There is an axial passage 71 of sufficient size to encompass the cables extending along the device.

The upper sub 70 threads to a center tube 75. They are threaded together at a connection with a relatively large, or a rather course thread. The thread is quite coarse, thereby permitting a coating of insulating material 76 to be applied to the threads. That is, the coating prevents metal to metal contact when the two tubular members are joined together. Moreover, the two threaded members define an external region having a reduced diameter to receive a bonded resilient sleeve of insulative material 77. In turn, that sleeve is covered by another external sleeve 78 which is preferably formed of epoxy resin impregnated into a sleeve of woven fiberglass material. This serves as a sheath around the length of the structure. This sheath covers almost ninety percent of the external surface of this apparatus.

The external sheath 78 extends past the lower sub and even laps over a box sub 80 at the lower end. The box sub is constructed with coarse threads in the same fashion as mentioned above and an insulating coating 81 prevents metal to metal contact between the box sub 80 and the center tube 75. In addition to that, there is an external annular neck area of reduced diameter to receive another resilient sleeve 82 which is similar to the sleeve 77 just mentioned. As noted, the fiberglass housing on the exterior extends over that sleeve. The box sub incorporates conventional box threads at 84 at the lower end. This enables connection in the assembled tool string.

The box sub additionally includes a connector assembly 85 which is housed therein and which includes a number of pins 86 for connection. The pin connector 85 mates with the socket at the opposite end of the isolator 20. The full length of the isolator is able to receive, hold and protect the several conductors necessary for operation. Moreover, this anchors safely and securely the electrical conductor pathways along the length of the tool string through the isolator 20 and the components connect above and below to it.

Speaking in very general terms about the isolator 20, there is no current flow path through it along the length of the structure. The threaded connections are protected with a coating of insulated material. Moreover, over ninety percent of the external surface thereof is wrapped in insulated material. To the extent that any metal is exposed, those metal components are electrically isolated, for instance at the thread insulator 76 just mentioned. The device 20 is intended to operate as a hermetically sealed structure which encloses the conductors therein to provide a dry environment for that. Thus, when the pin and box threaded connections are made in assembly of the rigid bridle, the system will operate with a dry interior.

Returning now to FIG. 1 of the drawings, the tool string shown in FIG. 1 must first be assembled at the surface of the well before it can be placed in the borehole. The sonde 10 is first supported in the borehole by conventional make-up plate support mechanisms. The barrier sub 19 is threaded above it. Then, one of the isolators 20 is threaded to that. Another isolator joint 20 is positioned thereabove and this process is repeated until the structure shown in FIG. 1 is assembled. This includes the step of installing the return electrode 16. Typically, this is in the range of two or three feet in length, and it, like the other components, threads into the tool assembly shown in FIG. 1. Another isolator section 20 is positioned above the return electrode 16. Last of all, the cable head 13 is attached along with the cable 12. This completes the assembly of the rigid bridle. During assembly, the components are threaded together and the structure is lowered partly into the well borehole 11, rested on make-up plates, and additional components threaded to the top. This is repeated sequentially so that the entire assembly is put together even where there is a lower overhead draw works. Vertical clearance does not have to be excessive, and indeed, a conventional thirty-two foot workover mast will suffice. Once assembly has been completed, the tool assembly shown in FIG. 1 can be lowered to the bottom of the well borehole 11 supported on the logging cable 12 and logging procedures can then be implemented. As previously noted, this positions the return electrode 16 at the proper vertical spacing along the tool assembly so that current flow from the sonde 15 flows into the formations adjacent to the well borehole and upwardly to return at the return electrode 16. While other portions of the assembly above the sonde are made up of exposed metal, nevertheless, all those components are electrically isolated so that no current flow is directed into them. Rather, the current is directed to the return electrode 16 because it is part of a completed circuit. All the other exposed metal components are electrically insulated. Moreover, the great portion of the exposed external surface is sheathed in insulative material such as the fiberglass wrap around the isolators 20.

ISOLATION SUB

An alternative short isolation sub 21 is shown in FIG. 3 of the drawings. It is constructed with a metal fitting 22 which has a set of threads at the upper end 23. Pin threads are located here, and box threads are found at the lower end as will be described. A surrounding shoulder 24 is made full gauge and defines the maximum diameter of the sub. The shoulder is immediately adjacent to a step of smaller diameter to enable a sleeve 25 to be positioned thereabout. The sleeve 25 is a sleeve made of ceramic material and is an electrical insulator. It fits snugly on the exterior, and is pressure isolated by suitable O-rings 26. The upper sub is axially hollow at 27 to provide a passage therethrough enabling conductors (not shown) to extend through the sub. The upper sub terminates at a set of threads 28 at the lower end, and a hollow retaining nut 29 is threaded on the exterior. There is a separate lower sub 30 also of steel construction and provided with box threads at 31 to enable connection with additional equipment. It is made with a full gauge construction up to the point of the sleeve 25. There, a neck portion 32 extends upwardly and into the top sub 22. The two subs thus telescope together, at least for a substantial portion of their respective lengths, and are concentrically positioned with the top sub 22 on the interior of the lower sub 30. The two subs are aligned with one another by the surrounding ceramic sleeve 25, a structure of insulative materials.

The two metal subs do not touch and are spaced apart from one another. A set of anti-rotation pins 35 of ceramic material is used to accomplish this. The pins 35 are positioned in shallow indentations formed in the exterior of the top sub 22, and mate with matching indentations on the interior of the sleeve 32 affixed to the lower sub. When the pins are so situated, the two subs are spaced apart and define an annular space 36 therebetween. The space 36 is an annular cavity which assures that the two metal components do not contact so that electrical isolation is assured. At the time of assembly, a retaining washer 38 made of ceramic material is inserted on the lower end of the upper sub 22. It is positioned abutting against an internal shoulder 39. The hollow retaining nut 29 is threaded to the lower end of the top sub 22. Since there is the possibility that it might back off, set screws 40 are positioned to hold the hollow retaining nut 29 in place.

The two metal subs 22 and 30 are thus separated from one another. At the upper end, the pins 35 which prevent rotation are secured in place. At the lower end, the washer assures that the metal components do not contact one another. Thus, the upper sub 22 and the lower sub 30 are made of metal and are even held together by the metal retaining nut 29. Nevertheless, when assembled, these components are spaced apart so that there is no metal contact and that there is not a current conduction path from the top sub to the lower sub. The electrical isolation is preferably in the range of about 100 or more megohms. There is in addition to that the axial passage 27 which extends through the apparatus from the pin end at the top to the box end at the bottom.

While the foregoing is directed to the preferred embodiment, the scope thereof is determined by the claims which follow.

What is claimed is:

1. A support apparatus for use with current emitting logging tools comprising:
   (a) an elongate rigid bridle formed of plural segments having a length of approximately fifteen feet per segment having an upper end cable head assembly for connection to a logging cable and a lower end for connection to a logging tool sonde having current emitting means therewith;
   (b) a current receiving electrode positioned along said bridle;
   (c) cooperative means extending along and interiorly of said bridle to pride signal communications from said cable head assembly to the logging tool sonde; and
   (d) electrical insulation means preventing current flow along said bridle other than through said cooperative means.

2. The apparatus of claim 1 wherein said rigid bridle is formed of three serially connected segments of approximately fifteen feet in length to thereby position said current receiving electrode approximately forty-five feet along said bridle.

3. The apparatus of claim 1 wherein said rigid bridle is made of metal members of a length less than the height of a conventional tilt-up workover rig to enable assembly thereof beneath the workover rig.

4. The apparatus of claim 1 wherein said rigid bridle is formed of elongate tubular metal components, and said electrical insulation means provides insulation along the length of said rigid bridle to prevent conduction along the length thereof.

5. The apparatus of claim 4 further including an external insulative covering around said rigid bridle covering a substantial portion of the surface thereof.

6. The apparatus of claim 5 wherein said rigid bridle terminates in pin and box connections for joinder to said cable head assembly at the upper end and said logging tool sonde at the lower end thereof.

7. The apparatus of claim 4 wherein said cooperative means includes interacting plug and socket means with conductors arranged interiorly of said rigid bridle to provide signal communications from said cable head assembly along said rigid bridle on the interior thereof.

8. The apparatus of claim 7 wherein said electrical conductors pass through a transverse bulkhead which prevents fluid leakage along said rigid bridle into said logging tool sonde.

9. A method of connecting a current emitting logging tool for logging in a well borehole wherein the method comprises the steps of:
   (a) on a logging cable having conductors therein, attaching an elongate rigid bridle having a specified length and supporting the logging tool at the lower end of the rigid bridle;
   (b) electrically insulating the rigid bridle to prevent current flow along the bridle by insulating its exposed surfaces to substantially cover the surfaces and by placing electrical insulation at spaced locations along the length thereof to prevent lengthwise current flow, said rigid bridle comprising plural lengthwise segments provided with interconnecting threads, and covering said threads with an electrical insulator to prevent current flow through the threads;
   (c) positioning on the rigid bridle a return current electrode at a specified distance above the logging tool so that current from the logging tool flows to the return electrode to complete a current flow path through the formations adjacent to the well borehole; and
   (d) moving the logging tool along the well borehole to make measurements while current flows through the return electrode.

10. The method of claim 9 including the step of connecting the return current electrode with means enabling a return circuit to be formed through said return electrode so that current flows through the formations and into said return electrode.

* * * * *